(12) United States Patent
Hashimoto

(10) Patent No.: US 7,609,417 B2
(45) Date of Patent: Oct. 27, 2009

(54) DATA PROCESSING APPARATUS, IMAGE PROCESSING APPARATUS, INFORMATION NOTIFYING METHOD THEREFOR, AND PROGRAM FOR IMPLEMENTING THE METHOD

(75) Inventor: Minoru Hashimoto, Chigasaki (JP)

(73) Assignee: Canon Kabushiki Kaisha (JP)

( * ) Notice: Subject to any disclaimer, the term of this patent is extended or adjusted under 35 U.S.C. 154(b) by 932 days.

(21) Appl. No.: 11/132,576

(22) Filed: May 19, 2005

(65) Prior Publication Data
US 2005/0270586 A1 Dec. 8, 2005

(30) Foreign Application Priority Data
May 19, 2004 (JP) .............................. 2004-149153

(51) Int. Cl.
H04N 1/00 (2006.01)
G06F 15/173 (2006.01)
(52) U.S. Cl. ........................................ 358/400; 709/225
(58) Field of Classification Search ................ 358/1.15, 358/296, 1.13, 400, 1.14, 402, 405; 709/9, 709/225, 238, 226, 229, 217, 203, 246, 245, 709/200, 206; 399/8, 10, 23, 24, 27, 81; 726/5, 12, 15, 28; 455/456.3, 557
See application file for complete search history.

(56) References Cited

U.S. PATENT DOCUMENTS 5,909,602 A * 6/1999 Nakai et al. .................... 399/8
5,946,457 A 8/1999 Nakai et al.
2001/0027469 A1 10/2001 Torikai
2004/0239992 A1 * 12/2004 Kawai et al. ............... 358/1.15

FOREIGN PATENT DOCUMENTS

| JP | 5-30371 A | 2/1993 |
|---|---|---|
| JP | H09-238215 A | 9/1997 |
| JP | H11-134127 A | 5/1999 |
| JP | 2000-132291 A | 5/2000 |
| JP | 2001-293939 A | 10/2001 |
| JP | 2002-196915 A | 7/2002 |
| JP | 2004-112715 A | 4/2004 |

* cited by examiner

Primary Examiner—Saeid Ebrahimi Dehkordy
(74) Attorney, Agent, or Firm—Rossi, Kimms & McDowell LLP

(57) ABSTRACT

A MFP 1 is connected via a network to a MFP expansion unit 3 that expands the functions of the MFP 1 in cooperation with the MFP 1, a mail server 6, and an information terminal 7 of an administrator who manages the MFP. When a power cable and a network cable of the MFP expansion unit 3 are connected and the power is turned on, the MFP 1 receives information notifying the administrator of the MFP 1 of added functions, the information having been generated and transmitted by the MFP expansion unit 3. The MFP 1 transmits an e-mail message generated based on the received information to an e-mail address of the administrator of the MFP 1 that is stored in advance in a hard disk drive 207 of the MFP 1.

11 Claims, 8 Drawing Sheets

FIG. 5

| BUTTON NUMBER | DISPLAY CHARACTERS | IP ADDRESS | FUNCTION NUMBER |
|---|---|---|---|
| 1 | FORMAT CONVERTING FUNCTION TIFF->JPEG | 192.168.1.2 | 1 |
| 2 | | | |
| 3 | | | |
| 4 | | | |

702 — To: John@company.com
703 — From: MFP1@company.com
Subject: MFP accessory was Installed

This eMail is generated and sent automatically.##

Dear MFP1's Administrator,

An MFP accessory was successfully installed on MFP1.

704 { The functions added into MFP1 are;
  1. Scan image convert function. (TIFF->JPEG)

705 { The information of MFP accessory are;
  IP address: 192.168.1.2
  Software version: 1.01 end of the document##

DATA PROCESSING APPARATUS, IMAGE PROCESSING APPARATUS, INFORMATION NOTIFYING METHOD THEREFOR, AND PROGRAM FOR IMPLEMENTING THE METHOD

BACKGROUND OF THE INVENTION

1. Field of the Invention

The present invention relates to a data processing apparatus, an image processing apparatus, an information notifying method therefor, and a program for implementing the method.

2. Description of the Related Art

A conventional MFP expansion unit is connected via a network to a MFP (multifunction printer) that has functions such as "copy", "print", and "scan" to expand the functions of the MFP (see Japanese Laid-Open Patent Publication (Kokai) No. H05-30371, for example). The MFP expansion unit optionally provides the MFP with functions that cannot be achieved by the standard construction of the MFP, such as a security improving function, a data format converting function for scanned images, an OCR (optical character recognition) function, and a storage function for image data or print data, such functions requiring high-level computational processing and/or a large-capacity storage device. By using an arrangement where a single MFP expansion unit is connected to a plurality of MFPs or an arrangement where a plurality of MFP expansion units are connected to a single MFP, there is an additional advantage in that data can be shared.

When constructing a cooperative system in which the MFP and the MFP expansion unit are connected via a network, a setting process is required for both the MFP expansion unit and the MFP. The setting process includes, for example, a process that searches for MFPs to be connected to the MFP expansion unit, a process that acquires information relating to the functions of the found MFPs and determines which functions of the MFP expansion unit can be installed, a process that registers the MFP expansion unit as a connected device in the MFP, and a process that displays or notifies a registration result for the MFP expansion unit. When a MFP expansion unit is installed in an environment in which a plurality of MFPs have already been installed, or when a plurality of MFPs are installed on different floors, the setting process becomes complicated.

To solve the above problem of the setting process being complicated, techniques for automating the settings have been devised. If DHCP (Dynamic Host Configuration Protocol) is introduced, for example, it becomes possible to automatically acquire information, such as an IP address, required for network connection. Also, by applying a technology such as UPnP (Universal Plug and Play), it is possible to automate processes such as the process of searching for MFPs or MFP expansion units to be connected, the process of acquiring function information, and the registration process. Displaying or notifying the registration result for a MFP expansion unit could be carried out by display on an operation panel, print out from the MFP, transmission of electronic mail (hereinafter referred to as "e-mail") to a specified address, or FAX transmission to a specified FAX number.

However, when a MFP expansion unit is installed for use by any MFP in an environment in which a plurality of MFPs exist, there may be a plurality of administrators managing the MFPs. For example, there are cases where the MFPs are installed on a plurality of different floors or in different sections, with a plurality of different administrators managing the MFPs in such different places. In such cases, to have users make effective use of the functions provided by the MFP expansion unit, it is desirable for the administrators of the MFPs to be notified that functions have been added by the MFP expansion unit. The person who has installed the MFP expansion unit, however, has to go to the trouble of looking up and contacting the administrators of the MFPs.

SUMMARY OF THE INVENTION

It is an object of the present invention to provide a data processing apparatus, an image processing apparatus, and an information notifying method therefor, which are capable of easily notifying recipients associated with respective image processing apparatuses such as MFPs of the installation of a data processing apparatus such as a MFP expansion unit or of functions added by the data processing apparatus, and a program for implementing the method.

To attain the above object, in a first aspect of the present invention, there is provided a data processing apparatus that adds at least one function to at least one image processing apparatus, comprising an acquisition device that acquires, from the image processing apparatus, information on at least one recipient to which notification information is to be transmitted, the notification information including at least one of information indicating that the data processing apparatus has been installed and information indicating that at least one function has been added to the image processing apparatus, and a transmission device that transmits the notification information to the recipient.

Preferably, the data processing apparatus further comprises a response requesting information transmitting device operable when the data processing apparatus has been installed on a network, to transmit response requesting information to the image processing apparatus, and a function adding device operable when a response to the response requesting information has been received from the image processing apparatus, to carry out a process that adds at least one function to the image processing apparatus that transmitted the response.

Preferably, the data processing apparatus further comprises an information acquiring device that acquires information on the functions of the image processing apparatus from the image processing apparatus, an expansion determining device that determines whether at least one function can be added to the functions of the image processing apparatus based on the acquired information, and a generation device that generates the notification information showing the at least one function that can be added.

A typical example of the information on the recipient is an electronic mail address, and the transmission device transmits the notification information to the electronic mail address via electronic mail.

Alternatively, the information on the recipient is a network address of a network printer, and the transmission device transmits the notification information as a print job to the network printer with the network address.

Further alternatively, the information on the recipient is a facsimile number, and the transmission device transmits the notification information by facsimile.

To attain the above object, in a second aspect of the present invention, there is provided an image processing apparatus to which at least one function is added by at least one data processing apparatus, comprising a storage device that stores information on at least one recipient to which notification information is to be transmitted, the notification information including at least one of information indicating that the data processing apparatus has been installed and information indicating that at least one function has been added to the image processing apparatus by the data processing apparatus, an acquisition device operable when the data processing apparatus has been installed on a network, to acquire the notification information transmitted from the data processing apparatus, and a transmission device that transmits the acquired notification information to the recipient.

To attain the above object, in a third aspect of the present invention, there is provided an information notifying method for a data processing apparatus that adds at least one function to at least one image processing apparatus, comprising an acquiring step of acquiring, from the image processing apparatus, information on at least one recipient to which notification information is to be transmitted, the notification information including at least one of information indicating that the data processing apparatus has been installed and information indicating that at least one function has been added to the image processing apparatus, and a transmitting step of transmitting the notification information to the recipient.

Preferably, the data processing apparatus further comprises a response requesting information transmitting step of transmitting response requesting information to the image processing apparatus when the data processing apparatus has been installed on a network, and a function adding step of carrying out a process that adds at least one function to the image processing apparatus that transmitted a response to the response requesting information when the response has been received from the image processing apparatus.

Preferably, the data processing apparatus further comprises an information acquiring step of acquiring information on the functions of the image processing apparatus from the image processing apparatus, an expansion determining step of determining whether at least one function can be added to the functions of the image processing apparatus based on the acquired information, and a generation step of generating the notification information showing the at least one function that can be added.

To attain the above object, in a fourth aspect of the present invention, there is provided an information notifying method for an image processing apparatus to which at least one function is added by at least one data processing apparatus, comprising a storage step of storing information on at least one recipient to which notification information is to be transmitted, the notification information including at least one of information indicating that the data processing apparatus has been installed and information indicating that at least one function has been added to the image processing apparatus by the data processing apparatus, an acquisition step of acquiring the notification information transmitted from the data processing apparatus when the data processing apparatus has been installed on a network, and a transmission step of transmitting the acquired notification information to the recipient.

To attain the above object, in a fifth aspect of the present invention, there is provided a program for causing a computer to execute an information notifying method for a data processing apparatus that adds at least one function to at least one image processing apparatus, comprising an acquisition module for acquiring, from the image processing apparatus, information on at least one recipient to which notification information is to be transmitted, the notification information including at least one of information indicating that the data processing apparatus has been installed and information indicating that at least one function has been added to the image processing apparatus, and a transmission module for transmitting the notification information to the recipient.

To attain the above object, in a sixth aspect of the present invention, there is provided a program for causing a computer to execute an information notifying method for an image processing apparatus to which at least one function is added by at least one data processing apparatus, comprising a storage module for storing information on at least one recipient to which notification information is to be transmitted, the notification information including at least one of information indicating that the data processing apparatus has been installed and information indicating that at least one function has been added to the image processing apparatus by the data processing apparatus, an acquisition module for acquiring the notification information transmitted from the data processing apparatus when the data processing apparatus has been installed on a network, and a transmission module for transmitting the acquired notification information to the recipient.

The above and other objects, features, and advantages of the invention will become more apparent from the following detailed description taken in conjunction with the accompanying drawings.

BRIEF DESCRIPTION OF THE DRAWINGS

FIG. 5 is a diagram showing an example of an expanded function information table stored in a hard disk appearing in FIG. 2;

FIG. 7 is a view showing an example of an e-mail transmitted from the MFP to a MFP administrator in the step S610 in FIG. 6;

DETAILED DESCRIPTION OF THE PREFERRED EMBODIMENTS

The present invention will now be described in detail with reference to the drawings showing a preferred embodiment thereof. It should be noted that the relative arrangement of the components, the numerical expressions and numerical values set forth in these embodiments do not limit the scope of the present invention unless it is specifically stated otherwise.

Figure 1:
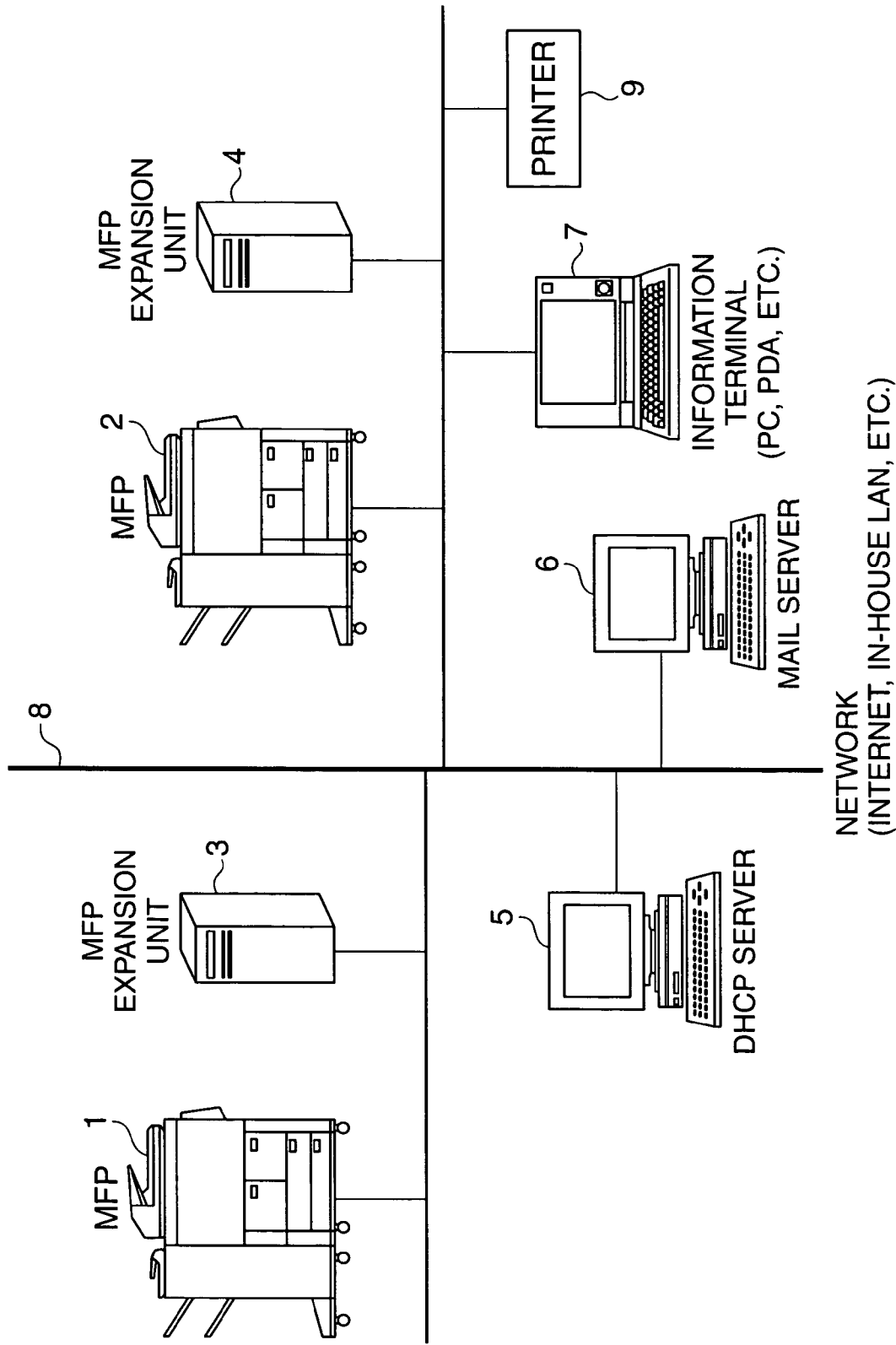
FIG. 1 is a block diagram schematically showing the construction of a system including a data processing apparatus according to an embodiment of the present invention.

FIG. 1 is a block diagram schematically showing the construction of a system including a data processing apparatus according to an embodiment of the present invention.

The system shown in FIG. 1 is comprised of multifunction printers (MFPs) 1 and 2 as image forming apparatuses with functions such as "print", copy "FAX", and scan", MFP expansion units 3 and 4 as data processing apparatuses that expand the functions of the MFPs 1, 2 in cooperation with the MFPs 1, 2, a DHCP server 5 including a function for returning an IP address and network parameters, which are necessary for network connection, in response to requests from components that construct the present system, a mail server 6 that uses electronic mail protocols such as SMTP and POP, an information terminal 7 such as a PC or PDA (Personal Data Assistant), and a printer 9, these components being connected to one another via a network, such as an ETHERNET (registered trademark). The information terminal 7 is used by an administrator who manages the MFPs 1, 2 and can access the printer 9, the MFPs 1, 2, and the MFP expansion units 3, 4 via a network 8. The printer 9 is normally used by the information terminal 7.

The MFPs 1, 2 and the MFP expansion units 3, 4 are shown as separate devices in FIG. 1, but the MFPs 1, 2 and the MFP expansion units 3, 4 may be integrated.

In the present embodiment, for ease of explanation, the MFPs 1, 2 have the same construction and the MFP expansion units 3, 4 also have the same construction. The MFP 1 and the MFP expansion unit 3 will now be described as representative examples.

Figure 2:
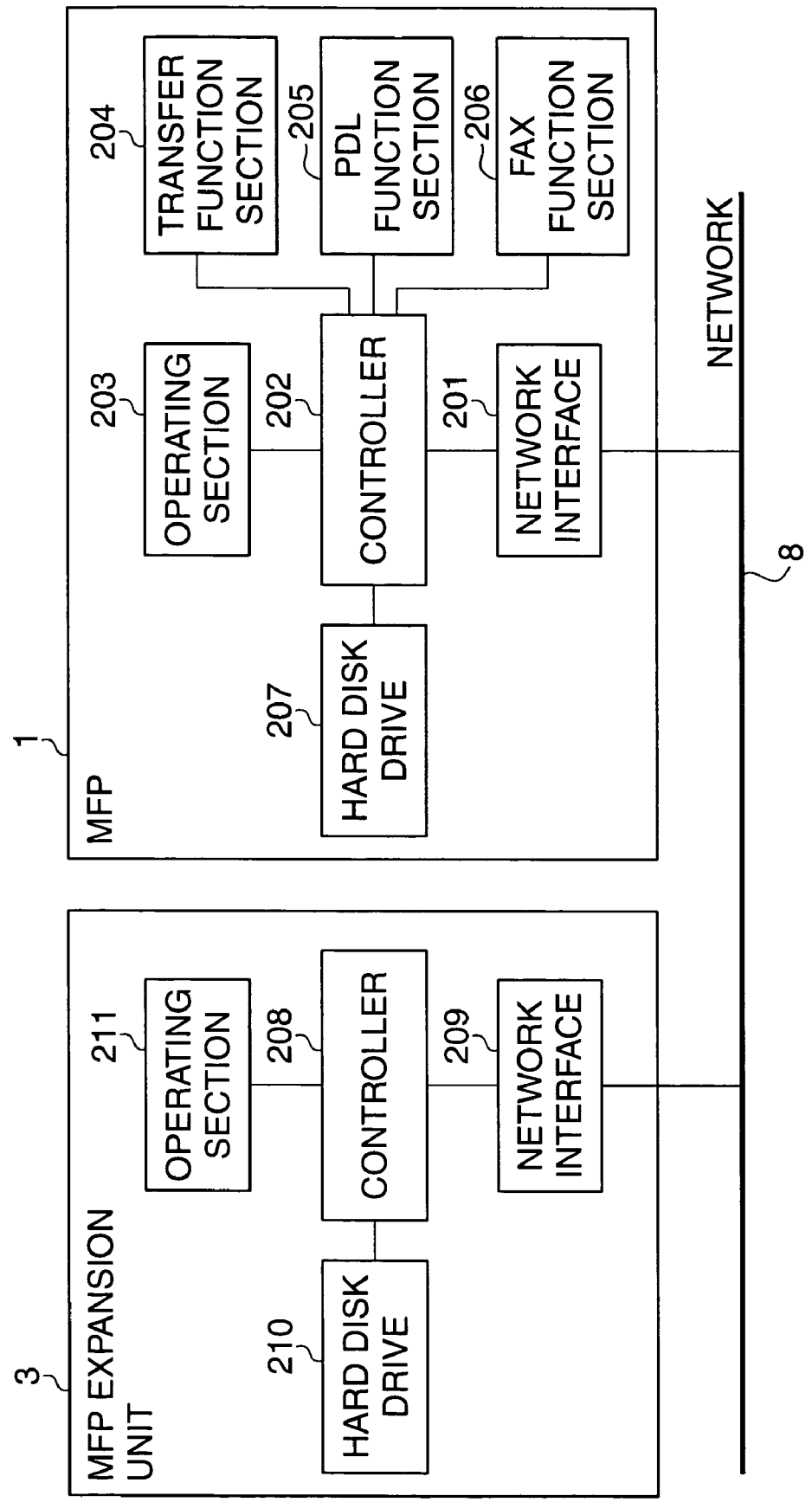
FIG. 2 is a block diagram showing the internal constructions of a MFP and a MFP expansion unit appearing in FIG. 1.

FIG. 2 is a block diagram showing the internal constructions of the MFP 1 and the MFP expansion unit 3 shown in FIG. 1.

As shown in FIG. 2, the MFP 1 is comprised of a network interface 201 connected to the network 8, a controller 202 that is connected to the respective components of the MFP 1 and controls operations of the respective components and data transfers between the respective components, an operating section 203 constructed of a touch panel-type LCD, LEDs, buttons, and the like, a transfer function section 204 that realizes a transfer function for scanning a paper document to convert the document image to image data and transferring the image data via the network interface 201 to an external device, a PDL function section 205 that realizes a PDL function for converting print information received from an external device via the network interface 201 to image data and printing an image on a recording sheet, a FAX function section 206 that realizes a FAX function for communicating with an external FAX apparatus, and a hard disk drive 207 that can store various setting values, operation history information, image data, and the like. Also, in the present embodiment, as described later with reference to FIG. 6, an e-mail address of the administrator of the MFP 1 is stored in advance in the hard disk drive 207, and in a variation of the present embodiment shown in FIG. 8, also described later, an IP address of the printer 9 normally used by the information terminal 7 of the administrator of the MFP 1 is stored in advance in the hard disk drive 207.

The transfer function section 204, the PDL function section 205, and the FAX function section 206 are not essential components, and are provided as desired by the user.

The MFP expansion unit 3 is comprised of a network interface 209 connected to the network 8, a controller 208 that is connected to the respective components of the MFP expansion unit 3 to control operations of the respective components and data transfers between the respective components, a hard disk drive 210 that can store operation programs and various setting values of the controller 208, operation history information, image data, and the like, and an operating section 211 composed of a touch panel-type LCD, LEDs, and buttons.

The MFP expansion unit 3 can add functions, such as a security improving function, a high-speed image processing function, and a storage function for storing a large amount of image data, to the MFP 1. The MFP expansion unit 3 can also be controlled through the operating section 203 of the MFP 1, with it being possible to carry out key input into the MFP expansion unit 3 from the operating section 203 of the MFP 1 and to display an image showing the state of the MFP expansion unit 3 on the operating section 203 of the MFP 1.

Although the MFP 1 and the MFP expansion unit 3 are connected via the network 8 in FIG. 2, it is also possible to use an arrangement where the MFP 1 and the MFP expansion unit 3 are connected by a dedicated line and only one of the MFP 1 and the MFP expansion unit 3 is connected to the network 8.

Figure 3:
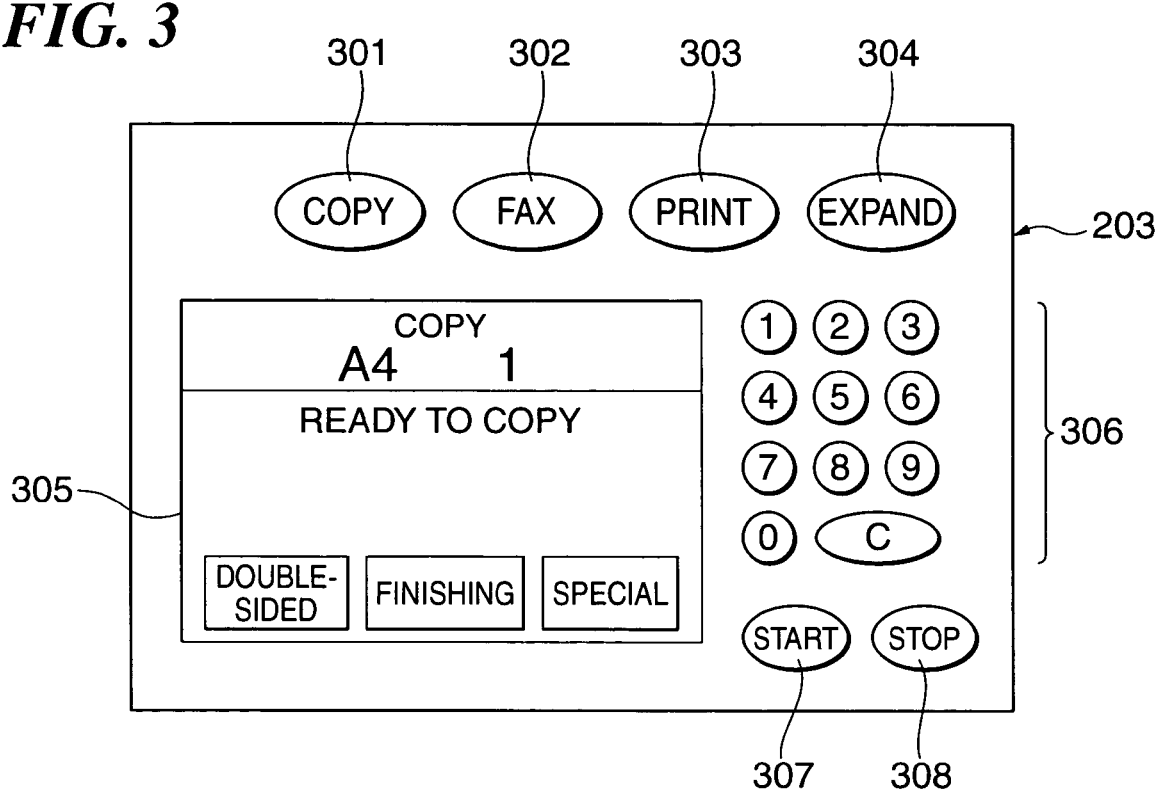
FIG. 3 is a view showing an example of a screen displayed on an operating section of the MFP shown in FIG. 2.

FIG. 3 is a view showing an example of a screen displayed on the operating section 203 of the MFP 1 shown in FIG. 2.

As shown in FIG. 3, the operating section 203 includes a copy button 301, a FAX button 302, a print button 303, and an expand button 304 for selecting one out of four modes, namely "copy", "FAX", "print", and "expand", a LCD panel 305 that serves as both a display device and a touch panel that can operate as buttons, a ten key 306 for inputting numerical values, a start button 307 for starting operations in the respective modes, and a stop button 308 for stopping an operation currently being executed.

When one of the copy button 301, the FAX button 302, the print button 303, and the expand button 304 is pressed, the screen of the LCD panel 305 switches to a screen for the mode corresponding to the pressed button. For example, when the expand button 304 is pressed, the display switches to a screen for an expand mode shown in FIG. 4 so that the functions of the MFP expansion unit 3 can be used.

Figure 4:
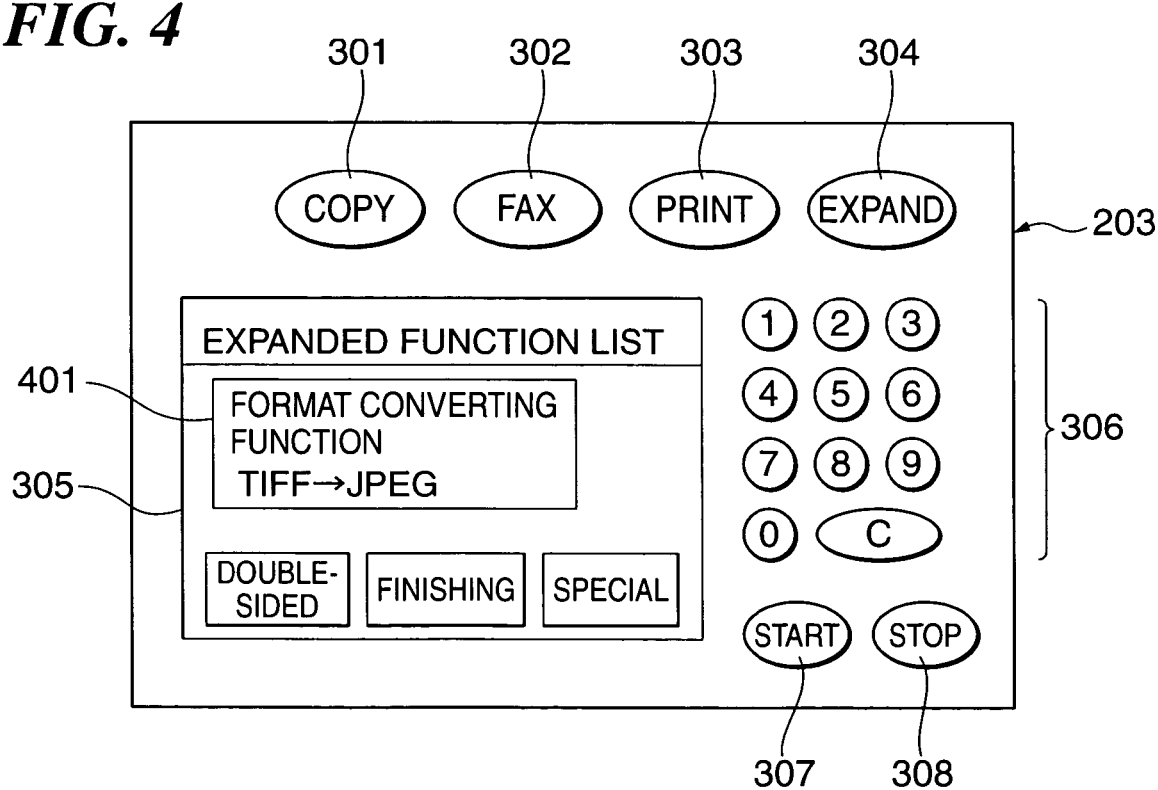
FIG. 4 is a view showing an example of a screen displayed on the operating section when an expand button appearing in FIG. 3 has been pressed.

As shown in FIG. 4, the LCD panel 305 is constructed so as to display buttons corresponding to the respective functions of the MFP expansion unit 3, and by pressing one of the buttons, it is possible to use the corresponding function of the MFP expansion unit 3. In the example in FIG. 4, the LCD panel 305 displays a button 401 corresponding to a format converting function for image data. When there are other functions added by the MFP expansion unit 3 and/or other MFP expansion units, the LCD panel 305 displays a plurality of buttons corresponding respectively to the functions added by the MFP expansion unit 3 and/or other MFP expansion units.

As one example, in the format converting function, scanned image data is sent to the MFP expansion unit 3 by the transfer function section 204 in TIFF format that is installed as standard in the MFP 1, the format is converted by the MFP expansion unit 3 from TIFF format to a desired format such as JPEG format, and the converted image data is transmitted to the hard disk drive 210 or the information terminal 7. Therefore, when the MFP 1 does not have the transfer function section 204, the format converting function cannot be used.

The MFP 1 stores an expanded function information table 500 shown in FIG. 5 in the hard disk drive 207 to manage information relating to the expanded functions that can be used.

As shown in FIG. 5, the expanded function information table 500 includes button numbers 501 that determine display positions of the buttons to be displayed on the LCD panel 305, display characters 502 in which character codes for text to be displayed on the buttons are stored, IP addresses 503 of the MFP expansion units with the functions corresponding to the buttons, and function numbers 504 that identify the functions corresponding to the buttons. These function numbers 504 identify the respective functions when the MFP expansion unit 3 has a plurality of functions.

When the button 401 is pressed, the MFP 1 notifies the MFP expansion unit 3 indicated by the IP address 503 that the button for the function represented by the function number 504 (here, the format converting function) has been pressed, and control over the LCD panel 305, the ten key 306, the start button 307, and the stop button 308 provided on the operating section 203 is passed to the MFP expansion unit 3. After this, the MFP expansion unit 3 acquires recipient designating information for the image data and carries out control over operations such as receiving the image data from the MFP 1 so that the format converting function can be realized.

Figure 6:
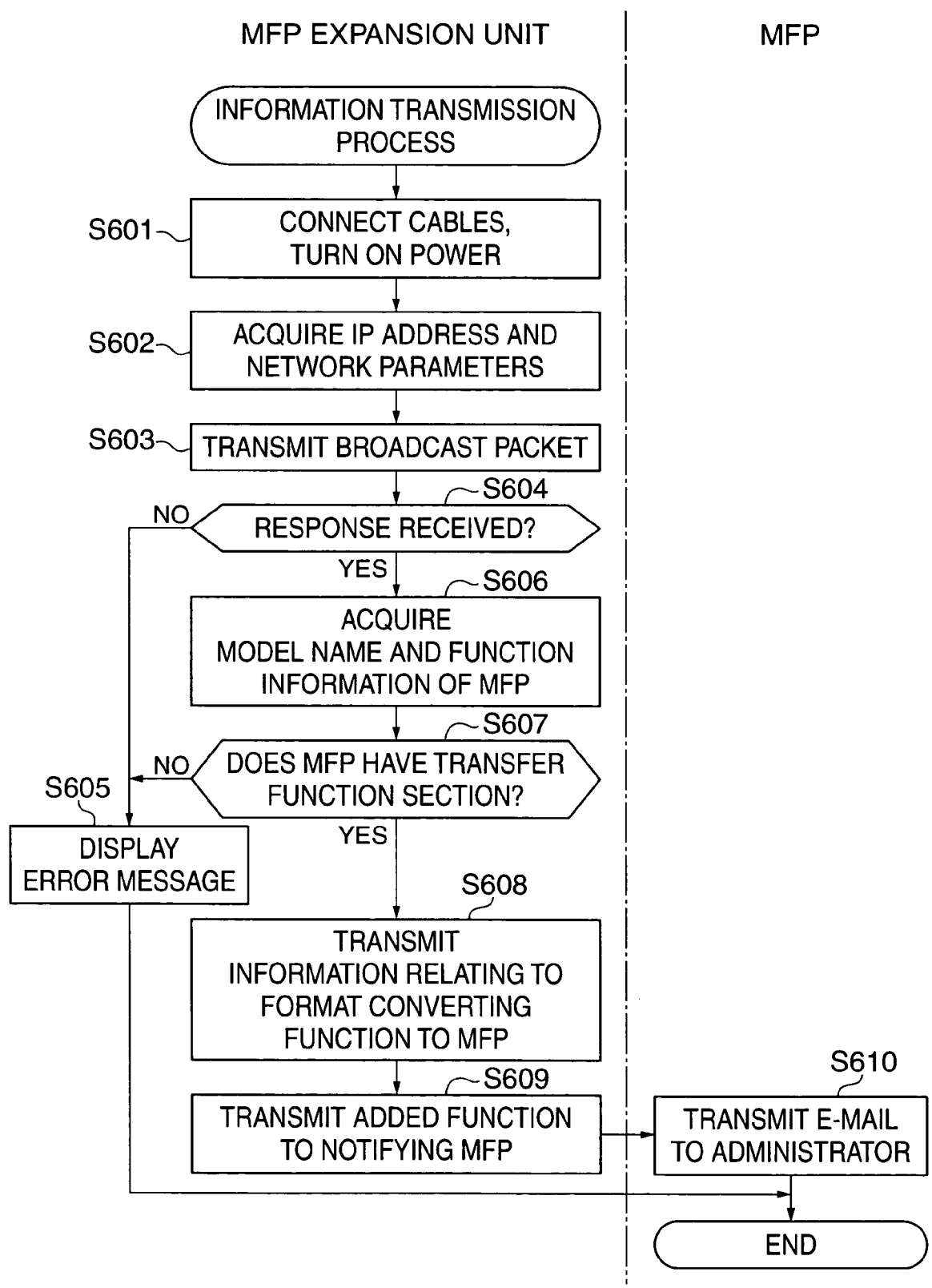
FIG. 6 is a flowchart showing the procedure of an information transmission process carried out by the MFP expansion unit and the MFP appearing in FIG. 1.

FIG. 6 is a flowchart showing the procedure of an information transmission process carried out by the MFP expansion unit 3 and the MFP 1 shown in FIG. 1.

In the following, a description will be given of an example in which when the MFP expansion unit 3 is newly installed in an environment in which the MFP 1 is already operating on the network 8 to add the format converting function to the MFP 1, an e-mail message notifying the administrator of the added function is transmitted from the MFP 1 to an e-mail address of the administrator that has been registered in advance in the hard disk drive 207 of the MFP 1.

In FIG. 6, when a power cable and a network cable of the MFP expansion unit 3 are connected and the power is turned on (step S601), the MFP expansion unit 3 acquires the IP address of the MFP expansion unit 3 and network parameters required for network connection from the DHCP server 5 (step S602). The acquisition of the IP address and the network parameters in the step S602 is carried out by the MFP expansion unit 3 transmitting a packet including an acquisition request for the IP address and the network parameters via the network 8 to the DHCP server 5 and the DHCP server 5 transmitting the IP address and the network parameters to the MFP expansion unit 3 in response to the acquisition request, if the DHCP server 5 is on the network.

Next, the MFP expansion unit 3 transmits a broadcast packet including a response request to the MFPs connected to the network 8 (step S603) and determines whether a response to the transmitted broadcast packet has been received from any of the MFPs (step S604) When there has been no response from any MFP, the MFP expansion unit 3 cannot connect to a MFP and therefore determines that an error has occurred and displays an error message on the operating section 211 (step S605). After this, the present process is terminated. On the other hand, when it is determined in the step S604 that there has been a response from a MFP, one or more functions is added to the MFP 1 that transmitted the response, and the process proceeds to a step S606. In this way, the MFP expansion unit 3 can reliably add functions to the MFP.

In the step S606, a model name and function information of the MFP 1 are acquired from the MFP 1. The acquisition of the model name and function information is carried out by the MFP expansion unit 3 transmitting a packet including an acquisition request for the model name and the function information to the IP address of the MFP 1 that was included in the response from the MFP 1 and the MFP 1 sending the model name and the function information to the MFP expansion unit 3 in response to the acquisition request.

Then, the MFP expansion unit 3 determines whether the MFP 1 includes the transfer function section 204 (step S607). When the MFP 1 does not include the transfer function section 204, it is not possible to use the format converting function of the MFP expansion unit 3 and therefore the MFP expansion unit 3 determines that an error has occurred and displays an error message on the operating section 211 (step S605). After this, the present process is terminated. In this way, from the model name and the function information acquired in the step S606, the MFP expansion unit 3 can determine whether it is possible to expand the functions of the MFP 1, so that functions can be added as appropriate to the MFP 1.

When it is determined in the step S607 that the MFP 1 includes the transfer function section 204, the MFP expansion unit 3 transmits to the MFP 1 information relating to the format converting function that can be newly used by the MFP 1 (step S608). Here, the expression "information relating to the format converting function" refers to information on a button to be displayed on the operating section 203 of the MFP 1 to realize the format converting function, a function number for identifying the format converting function, and the like.

Next, the MFP expansion unit 3 generates information that notifies the administrator of the MFP 1 of the added function and transmits the information to the MFP 1 (step S609). The MFP 1 logs in to the mail server 6 and transmits an e-mail message 701, which is shown in FIG. 7, described later, and is based on the information relating to the added function received from the MFP expansion unit 3, to the e-mail address of the administrator of the MFP 1 that is stored in advance in the MFP 1 (step S610). After this, the present process is terminated. In this way, since the MFP 1 generates the e-mail message 701 and transmits the e-mail message 701 to the e-mail address of the administrator, the administrator of the MFP 1 can be reliably notified of the functions added to the MFP expansion unit 3.

The e-mail message 701 shown in FIG. 7 includes a recipient electronic e-mail address 702, a sender electronic e-mail address 703, information 704 relating to the functions newly added to the MFP 1, and information 705 relating to the MFP expansion unit 3.

The e-mail address of the administrator of the MFP 1 stored in advance in the hard disk drive 207 of the MFP 1 is written in the recipient electronic e-mail address 702, and an e-mail account of the MFP 1 stored in the MFP 1 is written in the sender electronic e-mail address 703. Here, the text "An MFP accessory was successfully installed on MFP 1" is information showing that the MFP expansion unit 3 has been installed. As the information relating to the type of added functions, information showing that the format converting function that converts scanned image data from TIFF to JPEG is written into the information 704 relating to the functions newly added to the MFP 1. The IP address and software version of the MFP expansion unit 3 are written as the information 705 relating to the MFP expansion unit 3. The information relating to the added functions may be function identification information that identifies the added functions. The administrator who has received the e-mail message 701 can know that e-mail has arrived from the MFP 1.

According to the process in FIG. 6, when the power cable and network cable of the MFP expansion unit 3 are connected and the power supply is turned on (step S601), the MFP 1 receives information notifying the administrator of the MFP 1 of the added functions that has been generated and transmitted by the MFP expansion unit 3, and the e-mail message 701 generated based on the received information is transmitted to the e-mail address of the administrator of the MFP 1 that is stored in advance in the hard disk drive 207 of the MFP 1 (step S610), so that the administrator of the MFP 1 can be easily notified of the functions newly added to the MFP 1 by the MFP expansion unit 3. Although an example where a response is received from only the MFP 1 in the step S604 has been described with reference to FIG. 6, when there are responses from a plurality of MFPs, it is possible to carry out the same process as described above for the individual MFPs. By doing so, when the functions of the MFP expansion unit 3 are added to the plurality of MFPs, the plurality of MFPs can transmit information notifying the added functions to e-mail addresses of a plurality of administrators that are stored in the respective MFPs. In the same way, although an example where only one MFP expansion unit 3 has been installed on the network 8 in the step S601 has been described, in the case where a plurality of MFP expansion units have been installed on the network 8, the same process as described above can be carried out for the respective MFP expansion units. By doing so, when the functions of a plurality of MFP expansion units have been added to the MFP 1, the MFP 1 can transmit information notifying the functions added by the respective MFP expansion units to the stored e-mail address of the administrator.

Also, although an example where the MFP expansion unit 3 of the present embodiment has a single function, i.e., the format converting function for image data, has been described, the MFP expansion unit 3 may have a plurality of different functions. In this case, when it is necessary for the MFP to be equipped with predetermined components to make use of the functions of the MFP expansion unit, it is possible to appropriately add the plurality of functions to the MFP by determining, for each function of the MFP expansion unit, whether the MFP is equipped with the predetermined components.

Also, although the information notifying the added functions is transmitted by e-mail in the step S610, it is also possible to transmit the information as print data to a printer or to transmit the information by FAX. In this case, the MFP stores a network address of the printer as the recipient or a telephone number of the recipient.

Figure 8:
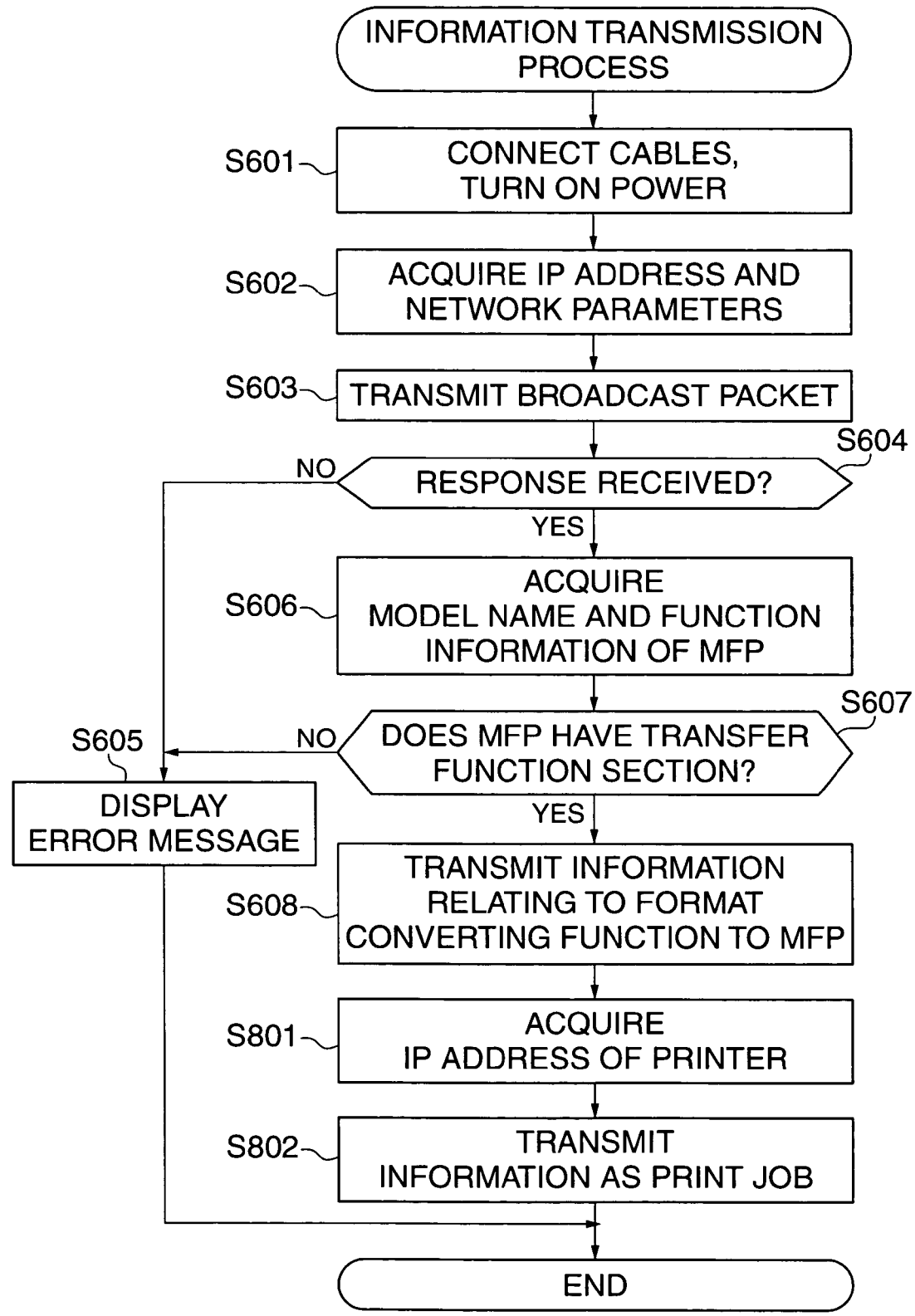
FIG. 8 is a flowchart showing the procedure of a variation of the information transmission process shown in FIG. 6.

FIG. 8 is a flowchart showing the procedure of a variation of the information transmission process shown in FIG. 6.

In the following, a description will be given of an example in which when the MFP expansion unit 3 is newly installed in an environment in which the MFP 1 is already operating on the network 8 to add the format converting function to the MFP 1, information notifying the added functions is transmitted from the MFP expansion unit 3 as a print job to the IP address of the printer 9 that has been registered in advance in the hard disk drive 207.

Although the printer to which the print job is transmitted is the printer 9 in the present variation, this is not limitative and any printer that is connected to the network 8 and has an IP address received in response from the DHCP server 5 can be used, such as one of the MFPs 1, 2.

The process shown in FIG. 8 is basically the same as the process shown in FIG. 6, and therefore steps that are the same as the steps shown in FIG. 6 are designated by identical reference numerals and description thereof is omitted. Only parts that differ to the process shown in FIG. 6 will be described below. The process shown in FIG. 8 differs to that shown in FIG. 6 in that the steps S609 and S610 that follow the step S608 are replaced with steps S801 and S802 and in that the MFP expansion unit 3 can directly transmit information to the printer 9.

In FIG. 8, when the MFP 1 has the transfer function section 204 ("Yes" to the step S607), the MFP expansion unit 3 transmits information relating to the format converting function that can be newly used by the MFP 1 to the MFP 1 (step S608), acquires from the MFP 1 the IP address of the printer 9 that is stored in advance in the hard disk drive 207 of the MFP 1 (step S801), generates information notifying the added function that is to be transmitted to the administrator, and transmits the generated information to the acquired IP address of the printer 9 as a print job (step S802), followed by the present process being terminated. The printer 9 that has received the print job outputs a printout 901 shown in FIG. 9, described later. In this way, the MFP expansion unit 3 generates a print job and transmits the print job to the printer 9, and can therefore reliably notify the administrator of the MFP 1 of the functions added by the MFP expansion unit 3.

Figure 9:
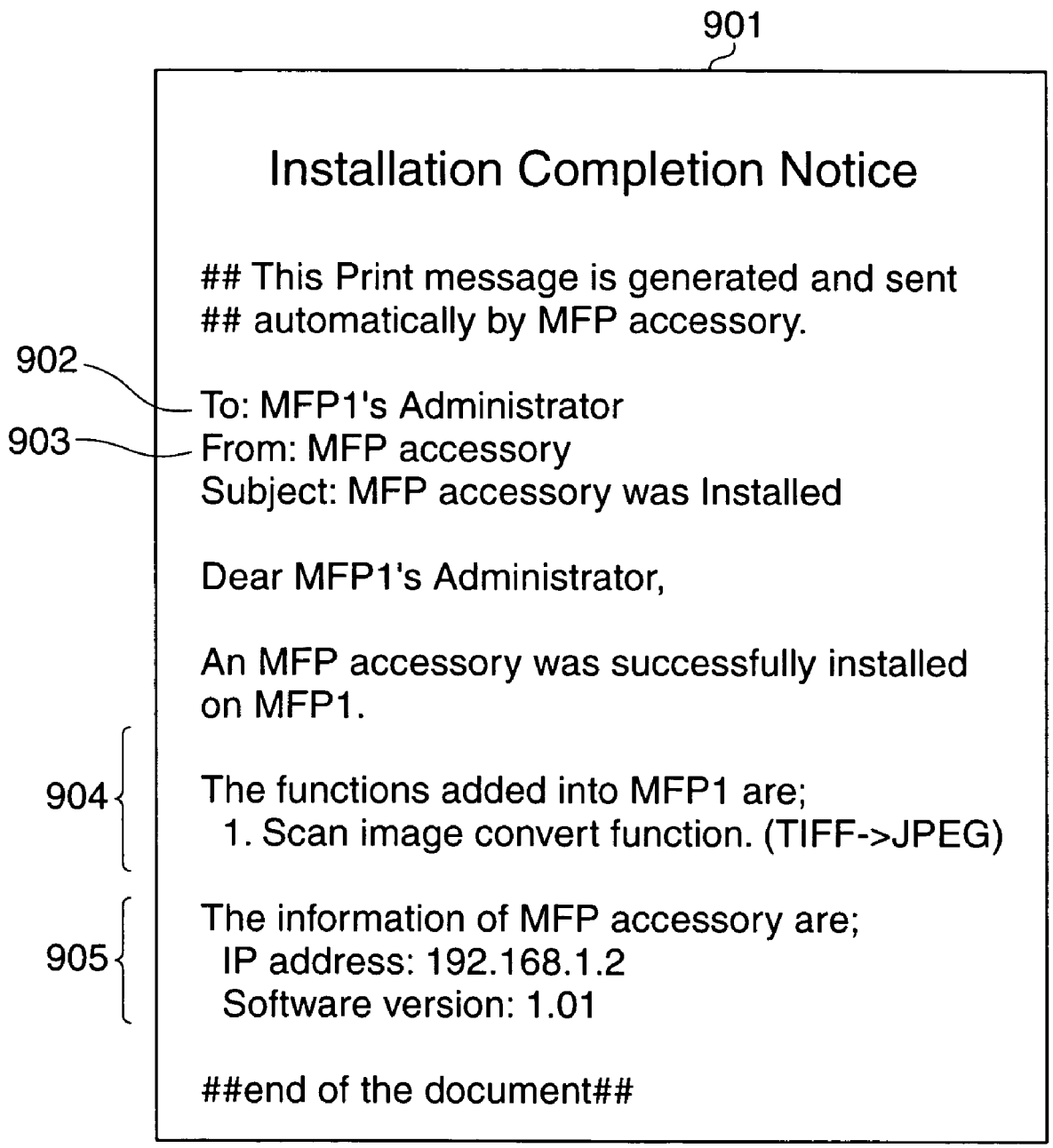
FIG. 9 is a view showing an example of a printout outputted by a printer in a step S802 in FIG. 8.

The printout 901 shown in FIG. 9 has the same content as the e-mail message 701 shown in FIG. 7, but the data of the printout 901 is transmitted as a print job, so that by setting the character size, font, and the like, it is possible to display the message in an understandable manner.

As shown in FIG. 9, the printout 901 includes a recipient 902, a sender 903, information relating to the functions newly added to the MFP 1, and information relating to the MFP expansion unit 3.

The name of the administrator of the MFP 1 is written as the recipient 902, and the name of the MFP expansion unit is written as the sender 903. Information showing that the format converting function that converts scanned image data from TIFF to JPEG is written as the information 904 relating to the type of function newly added to the MFP 1, and the IP address and software version of the MFP expansion unit 3 are written as the information 905 relating to the MFP expansion unit 3. The administrator who has seen the printout 901 outputted from the printer 9 can therefore know that the MFP expansion unit 3 has been installed for the MFP 1.

According to the process in FIG. 8, when the power cable and network cable of the MFP expansion unit 3 are connected and the power is turned on (step S601), the MFP expansion unit 3 acquires the IP address of the printer 9 that is stored in advance in the hard disk drive 207 of the MFP 1 (step S801), generates information notifying the added functions that is to be transmitted to the administrator, and transmits the generated information to the acquired IP address of the printer 9 as a print job (the S802). Therefore, it is possible to easily notify the administrator of the MFP 1 of the functions added to the MFP 1 by the MFP expansion unit 3.

Although information notifying the added functions is transmitted as a print job in the step S802, the information may be transmitted using e-mail or transmitted by FAX. In this case, the MFP expansion unit 3 acquires the recipient e-mail address or the recipient telephone number from the MFP in the step S801.

Although the example of e-mail transmission to a predetermined e-mail address as shown in FIG. 6 and the example of transmission of a print job to a predetermined printer as shown in FIG. 8 have been described as methods of contacting the administrator, the present invention is not limited to such, and other methods may be used. Also, although the information that notifies the administrator was generated by the MFP 1 in FIG. 6 and by the MFP expansion unit 3 in FIG. 8, the opposite may be the case.

It is to be understood that the present invention may also be accomplished by supplying a system or an apparatus with a storage medium (or recording medium) in which a program code of software which realizes the functions of the above described embodiment is stored, and causing a computer (or CPU or MPU) of the system or apparatus to read out and execute the program code stored in the storage medium.

In this case, the program code itself reads out from the storage medium realizes the functions of the embodiment described above, and hence the program code and the storage medium in which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a RAM, a NV-RAM, a floppy (registered trademark) disk, a magnetic-optical disk, a CD-ROM, a MO, a CD-R, a CD-RW, a DVD (a DVD-ROM, a DVD-RAM, a DVD-RW, or a DVD+RW), a magnetic tape, a nonvolatile memory card, and a ROM. Alternatively, the program may be supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2004-149153 filed May 19, 2004, which is hereby incorporated by reference herein.

What is claimed is:

1. A data processing apparatus that adds at least one function to at least one image processing apparatus, comprising:
   an acquisition device that acquires, from the image processing apparatus, information on at least one recipient to which notification information is to be transmitted, the notification information including at least one of information indicating that the data processing apparatus has been installed or information indicating that at least one function has been added to the image processing apparatus;
   a transmission device that transmits the notification information to the recipient;
   an information acquiring device that acquires information on the functions of the image processing apparatus from the image processing apparatus;
   an expansion determining device that determines whether at least one function is addable to the functions of the image processing apparatus based on the acquired information; and
   a generation device that generates the notification information showing the at least one function that is addable.

2. A data processing apparatus according to claim 1, further comprising:
   a response requesting information transmitting device operable when the data processing apparatus has been installed on a network, to transmit response requesting information to the image processing apparatus; and
   a function adding device operable when a response to the response requesting information has been received from the image processing apparatus, to carry out a process that adds at least one function to the image processing apparatus that transmitted the response.

3. A data processing apparatus according to claim 1, wherein the information on the recipient is an electronic mail address, and said transmission device transmits the notification information to the electronic mail address via electronic mail.

4. A data processing apparatus according to claim 1, wherein the information on the recipient is a network address of a network printer, and said transmission device transmits the notification information as a print job to the network printer with the network address.

5. A data processing apparatus according to claim 1, wherein the information on the recipient is a facsimile number, and said transmission device transmits the notification information by facsimile.

6. An information notifying method for a data processing apparatus that adds at least one function to at least one image processing apparatus, comprising:
   an acquiring step of acquiring, from the image processing apparatus, information on at least one recipient to which notification information is to be transmitted, the notification information including at least one of information indicating that the data processing apparatus has been installed or information indicating that at least one function has been added to the image processing apparatus;
   a transmitting step of transmitting the notification information to the recipient;
   an information acquiring step of acquiring information on the functions of the image processing apparatus from the image processing apparatus;
   an expansion determining step of determining whether at least one function is addable to the functions of the image processing apparatus based on the acquired information; and
   a generation step of generating the notification information showing the at least one function that is addable.

7. An information notifying method according to claim 6, further comprising:
   a response requesting information transmitting step of transmitting response requesting information to the image processing apparatus when the data processing apparatus has been installed on a network; and
   a function adding step of carrying out a process that adds at least one function to the image processing apparatus that transmitted a response to the response requesting information when the response has been received from the image processing apparatus.

8. An information notifying method according to claim 6, wherein the information on the recipient is an electronic mail address, and said transmission step transmits the notification information to the electronic mail address via electronic mail.

9. An information notifying method according to claim 6, wherein the information on the recipient is a network address of a network printer, and said transmission step transmits the notification information as a print job to the network printer.

10. An information notifying method according to claim 6, wherein the information on the recipient is a facsimile number, and said transmission step transmits the notification information by facsimile.

11. A computer-readable storage medium storing a computer program executable by a computer for controlling a data processing apparatus that adds at least one function to at least one image processing apparatus, comprising:
    an acquisition module for acquiring from the image processing apparatus, information on at least one recipient to which notification information is to be transmitted, the notification information including at least one of information indicating that the data processing apparatus has been installed or information indicating that at least one function has been added to the image processing apparatus;
    a transmission module for transmitting the notification information to the recipient;
    an information acquiring module for acquiring information on the functions of the image processing apparatus from the image processing apparatus;

an expansion determining module for determining whether at least one function is addable to the functions of the image processing apparatus based on the acquired information: and a generation module for generating the notification information showing the at least one function that is addable.

* * * * *